(12) United States Patent
Peters et al.

(10) Patent No.: US 9,839,863 B2
(45) Date of Patent: Dec. 12, 2017

(54) DOUBLE SHAFT REACTOR/MIXER AND SYSTEM INCLUDING AN END CAP FOR A REACTOR/MIXER AND A DISCHARGE SCREW CONNECTOR BLOCK

(71) Applicant: Buss-SMS-Canzler GmbH, Butzbach (DE)

(72) Inventors: Hans Peters, Weil (DE); Steffen Mohr, Münzenberg (DE)

(73) Assignee: BUSS-SMS-CANZLER GMBH, Butzbach (DE)

( * ) Notice: Subject to any disclaimer, the term of this patent is extended or adjusted under 35 U.S.C. 154(b) by 149 days.

(21) Appl. No.: 14/253,234

(22) Filed: Apr. 15, 2014

(65) Prior Publication Data
US 2014/0321232 A1    Oct. 30, 2014

(30) Foreign Application Priority Data

Apr. 26, 2013    (EP) .................................... 13002207

(51) Int. Cl.
*B01F 7/00*    (2006.01)
*B01D 19/00*   (2006.01)
(Continued)

(52) U.S. Cl.
CPC ...... *B01D 19/0052* (2013.01); *B01F 7/00208* (2013.01); *B01F 7/00466* (2013.01); *B01F 7/042* (2013.01); *B01F 7/048* (2013.01); *B01F 15/00928* (2013.01); *B01F 15/0289* (2013.01); *B01J 19/20* (2013.01); *B29B 7/46* (2013.01); *B01J 2219/00058* (2013.01);
(Continued)

(58) Field of Classification Search
CPC .................................. B01F 7/048; B01J 19/20
USPC ...... 366/302, 307, 301, 303, 312, 313, 325.4
See application file for complete search history.

(56) References Cited

U.S. PATENT DOCUMENTS 2,283,008 A    5/1942   Le Bar et al.
3,498,762 A *  3/1970   van der Schee ......... B01D 3/10
                                                    159/10
(Continued)

FOREIGN PATENT DOCUMENTS

CH    664 704 A5      3/1988
DE    195 36 944 A1   4/1997
(Continued)

OTHER PUBLICATIONS

Extended European Search Report issued in Application No. EP 13002207.2 dated Feb. 6, 2014.

*Primary Examiner* — Tony G Soohoo
*Assistant Examiner* — Elizabeth Insler
(74) *Attorney, Agent, or Firm* — Oliff PLC

(57) ABSTRACT

An at least two shaft reactor/mixer, in particular for process engineering treatment of highly viscose, elastic and/or solid containing reaction substance and mixture, in which at the housing inner wall inwardly directed static mixing elements are arranged, which interact with scrapers of the at least two shafts in such a way, that in the area of the spaces between the scrapers the static mixing elements and the housing inner wall sheer forces, in particular a flow disturbance, are generated in an enhanced manner. In addition, there is a system including an end cap for a one or multiple shaft reactor/mixer and a discharge screw connector block being connectable with the end cap in a detachable manner.

15 Claims, 8 Drawing Sheets

(51) Int. Cl.
 *B01F 7/04* (2006.01)
 *B01F 15/00* (2006.01)
 *B01F 15/02* (2006.01)
 *B01J 19/20* (2006.01)
 *B29B 7/46* (2006.01)

(52) U.S. Cl.
 CPC ............. *B01J 2219/00094* (2013.01); *B01J 2219/00162* (2013.01); *B01J 2219/00186* (2013.01)

(56) References Cited

U.S. PATENT DOCUMENTS

| | | | |
|---|---|---|---|
| 3,869,111 A | | 3/1975 | Matsuoka |
| 3,951,389 A | * | 4/1976 | Porter ................ G01R 21/00 366/142 |
| 4,127,372 A | | 11/1978 | Perla et al. |
| 4,185,925 A | | 1/1980 | Gazzoni |
| 4,941,130 A | * | 7/1990 | List ..................... B01F 7/048 366/149 |
| 5,055,273 A | * | 10/1991 | Wilhelm ............... B01F 15/068 366/147 |
| 5,362,146 A | * | 11/1994 | Nogossek ............. B29C 47/38 366/307 |
| 5,658,075 A | * | 8/1997 | Schebesta ............ B01F 7/042 366/298 |
| 6,039,469 A | * | 3/2000 | Palmer .................. B01F 7/042 366/301 |
| 8,177,414 B1 | | 5/2012 | Wenger |
| 2012/0269028 A1 | | 10/2012 | Gordon |

FOREIGN PATENT DOCUMENTS

| | | |
|---|---|---|
| DE | 297 15 101 U1 | 12/1997 |
| DE | 102 46 639 A1 | 4/2004 |
| DE | 10 2004 014163 A1 | 12/2004 |
| DE | 103 42 982 B3 | 2/2005 |
| DE | 10 2007 034 875 B3 | 10/2008 |
| EP | 0 715 882 A2 | 6/1996 |
| EP | 1 101 525 A1 | 5/2001 |
| EP | 1 247 454 A1 | 10/2002 |
| EP | 2 527 771 A1 | 11/2012 |
| WO | WO 90/05452 A1 | 5/1990 |

* cited by examiner

DOUBLE SHAFT REACTOR/MIXER AND SYSTEM INCLUDING AN END CAP FOR A REACTOR/MIXER AND A DISCHARGE SCREW CONNECTOR BLOCK

BACKGROUND OF THE INVENTION

The present invention relates to an at least two shaft reactor/mixer, in particular for process engineering treatment—e.g. for devolatilization (degassing)—of highly viscose and/or solid-containing reaction substance and mixture as well as to a system including an end cap for a reactor/mixer and a discharge screw connector block being connectable with an end cap. This kind or reactors/mixers are applied for example in the production and processing of polymers and/or plastic materials as well as rubber and/or elastomers, i.e. in cases in which a good mixing effect and, if applicable, also a quick regeneration of free surfaces for the purpose of evaporating, respectively, devolatilization (degassing) shall be ensured. Further, such reactors/mixers should comprise a self-cleaning potential as good as possible, in order that as little as possible encrustation occurs at the reactor walls, respectively at the mixing instruments. This may namely lead to disturbing side reactions in the reactor chamber and therefore to contamination and inhomogeneity of the respective product to be produced.

A self-cleaning reactor/mixer is known from EP 0 715 882 A2. This reactor/mixer consists of two or more parallel shafts, which rotate in the same direction on which axially offset discs are arranged which comprise a not necessarily circular circumference. The discs comprise scrapers being distributed on their circumference.

The reactor/mixer is enclosed by a housing. The reactor/mixer shall be constructed in such a way that all surfaces of the scrapers may be cleaned kinematically and that all surfaces of the scrapers of a shaft being directed outwardly are convex in an arbitrary radial section through the mixer and are cleaned by an adjacent shaft or its scrapers or by the housing. Further, all inwardly directed surfaces of the scrapers of a shaft are concave in an arbitrary radial section through the mixer and are cleaned by the scrapers of an adjacent shaft. During the cleaning of the housing through the scrapers between the housing wall and the cleaning surface of the scraper, only angles greater than 90° occur at the product side. Further, during the mutual cleaning of the scrapers, only angles greater than 60°, preferably greater than 90°, occur among one another between the cleaned and the cleaning surface of the scrapers which contact one another.

SUMMARY OF THE INVENTION

However, it has been found in practice that in this two shaft reactor/mixer, in particular the cleaning of the housing inner wall, may still be improved and that also areas exist with a relatively small product mixing. In particular, the inner wall of the housing is not fully cleaned kinematicallly through the gap, which is formed by the scrapers being mounted on the discs in axial direction. This was found surprising insofar as in this reactor/mixer relatively great forces are generated due to the two shaft mixing and in particular in such areas in which the mixing elements, respectively kneading bars, meet each other.

The discharge of the respectively mixed products from conventional reactors/mixers usually occurs via a screw apparatus, which is fixedly integrated in the end cap of the housing, i.e. at the non-driven end of the reactor/mixer. The integration of the discharge screw apparatus into the end cap does however lead to expensive forgings, respectively to weldments which are expensive in production.

It is therefore the object of the present invention to provide a two shaft reactor/mixer, by means of which a better mixing through a respective distribution of the flow disturbances across the reaction chamber may occur, without that thereby the fatigue strength of the reactor/mixer is exceeded. In this context, an intensified process shall be achieved and, in particular, also an enhanced cleaning effect for the housing inner wall. Moreover, a system shall be provided, which effects in a simple and inexpensive manner a modular connection of an end cap of a reactor/mixer with a (separate) discharge screw connector block.

This object is solved according to the present invention by a rector/mixer, in particular for process engineering treatment of highly viscose and/or solid containing reaction substance and mixture, comprising: a housing with an inner—as well as an outer wall, which defines a reaction chamber and which fully or partially encloses at least two shafts, wherein the shafts are rotatably supported in the housing and/or in lateral attachment parts of the housing, and are driven a motor, wherein on the shafts disc-shaped elements are arranged which are actually offset to one another, wherein the disc-shaped elements respectively comprise at their circumference outwardly directed scrapers, wherein the disc-shaped elements and/or the scrapers of a shaft respectively carry out with the disc-shaped elements and/or the scrapers of an adjacent shaft as well as with the housing a mutual, kinematic cleaning of the disc-shaped elements and/or scrapers, and wherein at the housing inner wall inwardly directed, static mixing elements are arranged, which interact with the scrapers of the at least two shafts in such a way, that in the area of the spaces between the scrapers, the static mixing elements and the housing inner wall, sheer forces, in particular a flow disturbance, are created in an enhanced manner. This object is further solved in accordance with the present invention by a system including an end cap for a one- or multiple shaft reactor/mixer and a discharge screw connector block being connectable with the end cap in a detachable manner, wherein the end cap comprises at least a bearing for receiving at least one shaft end, as well as multiple bores for receiving fastening means, and a mixture outlet opening; and wherein the discharge screw connector block comprises at least one channel for receiving at least one discharge screw, as well as a mixture inlet opening corresponding with the mixture outlet opening of the end cap, and which leads into the at least one channel, and multiple bores, which at least partially correspond with the bores in the end cap.

With the aid of the inventive reactor/mixer, in particular an intensified mixing effect may be achieved, which in particular with regard to devolatilization (degassing) and compounding tasks leads to a reduction of the duration of proceedings, and therefore, to smaller machines. Due to the fact that the plug flow is stronger with two shaft reactors (respectively transport movement of the reaction substance) stronger flow disturbances may be achieved by the static mixing elements and thus, a particularly advantageous surface distribution of the reaction substance, as compared for example with one shaft reactors with static mixing elements, where the latter may be provided for cleaning purposes, if applicable. Further, an enhanced decoupling of rotor rotational speed, axial transport and degree of filling is achieved, which enables a better operational control and more adaptability. In addition, an increase and an adaption of dissipation is achieved in certain regions of the reactor/mixer, which is in particular advantageous during melting, since a better heat input is ensured and thus, the efficiency during devolatilization (degassing) and during reaction of highly viscose products is increased.

By means of the inventive system it is enabled, to screw the discharge screw(s) onto the housing of a reactor/mixer. This results in a significantly facilitated mounting and de-mounting with respective cost advantages. The system may be used with all known large volume, one- or multiple shaft reactors/mixers and enables therefore a great flexibility in use.

It is noted, that the disc-shaped elements are usually formed in the cross-section as approximately ring-shaped disc-elements. The disc-shaped elements may however also comprise gap-like interruptions between the individual scrapers, such that in cross-section an approximately star-shaped configuration results. It is further also conceivable, that the scrapers are arranged directly on the shaft, wherein also in such a configuration the lower connection areas of the scrapers represent disc-shaped elements in the sense of the present invention.

In a preferred embodiment of the inventive reactor/mixer, the at least two shafts are respectively driven with the same rotational speed by the motor. In this manner, a particularly even mixture may be achieved, and simultaneously an even load distribution across the housing wall. This is in particular important with regard to the static mixing elements, which create additional (in addition to the two overlapping shafts) sheer forces and contribute in this manner generally to a higher stress of the housing wall. It seemed inexpedient to apply static mixing elements in two shaft reactors/mixers at all.

Further preferred, the shafts are driven in the same rotational direction. Shafts which rotate in the same rotational direction usually comprise better devolatilization (degassing) characteristics as shafts which rotate in opposite directions, since here a film is created, when the reaction substance is shoveled from one shaft to the other. In addition the shafts are preferably supported horizontally within the reactor housing.

In a further preferred embodiment of the inventive reactor/mixer the reaction chamber comprises in the cross-section approximately the shape of a horizontal eight with a center point P through which a horizontal axis E and a vertical axis F pass. This geometry has proven to be particularly efficient and stable during the process engineering treatment of elastic, highly viscose and solid containing reaction substance and mixture. Through the center point P, respectively also passes the longitudinal axis of the reaction chamber. It was found that with a purely oval shape of the reaction chamber an insufficient mixing above and below the area of overlap of the shafts may occur.

According to a still further preferred embodiment of the inventive reactor/mixer the static mixing elements are arranged, departing from the center point P, in an angular area α of approximately 180°, preferably approximately 150° and particularly preferred approximately 120° in the lower area of the housing inner wall. In this manner, a particularly effective process engineering intensification of the mixture, respectively exchange ratio may be achieved in the lower area of the reactor/mixer, i.e. in the filled portion of the reaction chamber. Generally, it is however also possible to distribute the mixing elements across the entire circumference of the reactor/mixer. Since highly viscose media do not remain lying (bath tub effect) in contrast to low viscose media, but are distributed by the rotors across the entire circumference of the reactor/mixer, a corresponding arrangement is meaningful for many applications. The above mentioned angular areas are in particular suited for two shaft reactors/mixers with the above described cross sectional shape, since here the greatest potential exists for a process intensification.

According to another preferred embodiment of the inventive reactor/mixer, the static mixing elements are arranged in even circumferential distances at the housing inner wall. Particularly preferred are hereby distances of 45° and still further preferred of 30°. If the static mixing elements are for example arranged in an angular area α of 180°, respectively three or four static mixing elements are arranged in the left as well as in the right part of the horizontal eight, wherein the lower most static mixing elements are aligned respectively parallel to the vertical axis F. The respectively laterally outermost static mixing elements are preferably aligned along the horizontal axis F.

In a still other preferred embodiment of the inventive reactor/mixer the static mixing elements are aligned in the longitudinal direction, respectively in a row. In this manner, a particularly advantageous operational control may be ensured. However, the static mixing elements may only be arranged in the area of particularly critical zones, as may be the case for example with very high viscosities, shortly before a phase change or after the addition of additional components as for example reactants, additives etc. Regularly, the static mixing elements are however arranged across the entire length of the reactor/mixer. In this way, the overall efficiency of the mixing operation may be enhanced.

In a further preferred embodiment of the inventive reactor/mixer the static mixing elements are formed as rhombical rods. However, also round rods or T-shaped static mixing elements (with e.g. round or rhombical cross-section) are conceivable. In the case of rod-shaped static mixing elements, the latter protrude approximately as far into the inner of the reaction chamber, that they are flush with the underside of the regularly T-shaped mixing elements on the shafts, respectively discs. In the case of T-shaped, static mixing elements, the T-beams of the static mixing elements engage just behind the T-beams of the mixing elements on the shafts, respectively discs. In this way, as small as possible distances are achieved between the static mixing elements and the (dynamic) mixing elements among themselves as well as also with regard to the housing inner wall. The sheer forces created in this manner improve the cleaning effect with regard to the housing wall and in addition also the mutual cleaning effect. The exact geometric configuration of the static mixing elements depends however, respectively, on the goods respectively products to be mixed as well as on the respective pressures and temperatures. For each mixing row in the longitudinal direction or within a mixing row, the static mixing elements may be shaped in a different manner. The static mixing elements may however also be omitted in sections.

In a still other preferred embodiment of the inventive reactor/mixer, the static mixing elements comprise one or multiple bores. Through these bores, for example liquid additives, catalysts or other easy-flowing aggregates may be dosed directly into the mixture. Preferably, the one or multiples bores are provided with measuring devices. The measuring devices may include measuring elements for temperature, pressure, concentrations etc.

In a further preferred embodiment of the inventive reactor/mixer, the static mixing elements are respectively inserted through an opening in the housing wall into the reactor/mixer and are mounted by means of a pressure fitting—i.e. in particular a detachable screw connection—at the housing. In this manner, a particularly high stability of the entire reactor/mixer may be ensured.

In a still other preferred embodiment of the inventive reactor/mixer, the reactor/mixer comprises an at least partly open housing. This also depends regularly on the pressure and/or temperature conditions, which are present during the mixing of the respective reaction substances/mixtures.

In a further preferred embodiment of the inventive reactor/mixer, the reactor/mixer comprises a large volume vapor collection space above the at least partly open housing. Such a construction may in particular serve for providing a deep pressure or a high vacuum at the product surface. Further preferred, there is arranged a baffle in the large volume vapor collection space. The baffle shall direct the resulting vapor in the direction of the vapor outlet. Further, the baffle shall avoid the formation of depositions in the lower area of the vapor collection space, which adjoins the reactor wall. Preferably, the vapor collection space housing, inclusive connector flange and vapor outlet is heatable in order to avoid condensation.

In a preferred embodiment of the inventive system, a drive for the one or the multiple discharge screws may be arranged in a detachable manner at the discharge screw connector block. For this purpose, the discharge screw connector block regularly comprises a connector flange with multiple circumferential bores, at which the drive, respectively the motor for the at least one discharge screw may be screwed on. In this way, a particularly efficient modular assembly of these components is provided.

In an again different preferred embodiment of the inventive system, the discharge screw connector block comprises in the area of the mixture inlet opening a fitting-like fixing piece. This fitting-like fixing piece generally serves for the mounting of the discharge screw connector block at the end cap, which again is screwed onto the housing of the respective reactor/mixer.

In a still further preferred embodiment of the inventive system, the fitting-like fixing piece comprises an inner frame area, which encloses the mixture inlet opening of the discharge screw connector block and into which openings for receiving fastening means are introduced, by means of which the end cap is mountable at the discharge screw connector block. In this manner, a particularly good sealing in the area of the mixture inlet opening may be achieved. In a still further different preferred embodiment of the inventive system, the fitting-like fixing piece comprises an outer frame area, into which openings for receiving fastening means are introduced, by means of which the discharge screw connector block may be mounted at the end cap. In this way, an optimal mutual mounting of the discharge screw connector block at the end cap may be guaranteed.

In a further preferred embodiment of the inventive system, the outer frame area additionally comprises laterally open bores, which are aligned with respective blind hole bores in the end cap outer side which faces the discharge screw connector block. Further preferred sealing bolts may be introduced into the blind hole bores in the end cap outer side. This configuration provides the basis for a particularly well-sealed mounting.

In a still further preferred embodiment of the inventive system, there is provided in the inside of the end cap, which is directed away from the discharge screw connector block, a recess is introduced, which essentially corresponds with the inner frame area of the fitting-like fixing piece. In this recess, preferably a screen is inserted. The screen thereby covers the heads of the fastening means, which are introduced through respective openings in the recess through the end cap into the corresponding openings in the inner frame area of the fitting-like fixing piece.

In a still different preferred embodiment of the present invention, the screen is pulled into the recess in the end cap inner side by means of screw bolts, which are screwed into the blind hole bores in the end cap outer side with a respective screw nut, such that a particularly efficient sealing relative to the reactor inner space occurs.

In a still other preferred embodiment of the present invention, the screen comprises an opening, which is smaller than the mixture inlet opening of the discharge screw connector block. In this manner, an enlargement of the flow cross section in flow direction is created, which enables a better transportation of the mixture through the one or more discharge screws.

The inventive system may be used for all sorts of one or multiple shaft reactors/mixers. Preferably, it is used in connection with the inventive reactor/mixer.

BRIEF DESCRIPTION OF THE DRAWINGS

An inventive reactor/mixer as well as an inventive system are illustrated by means of the attached drawings which show.

DETAILED DESCRIPTION OF EMBODIMENTS

Figure 1:
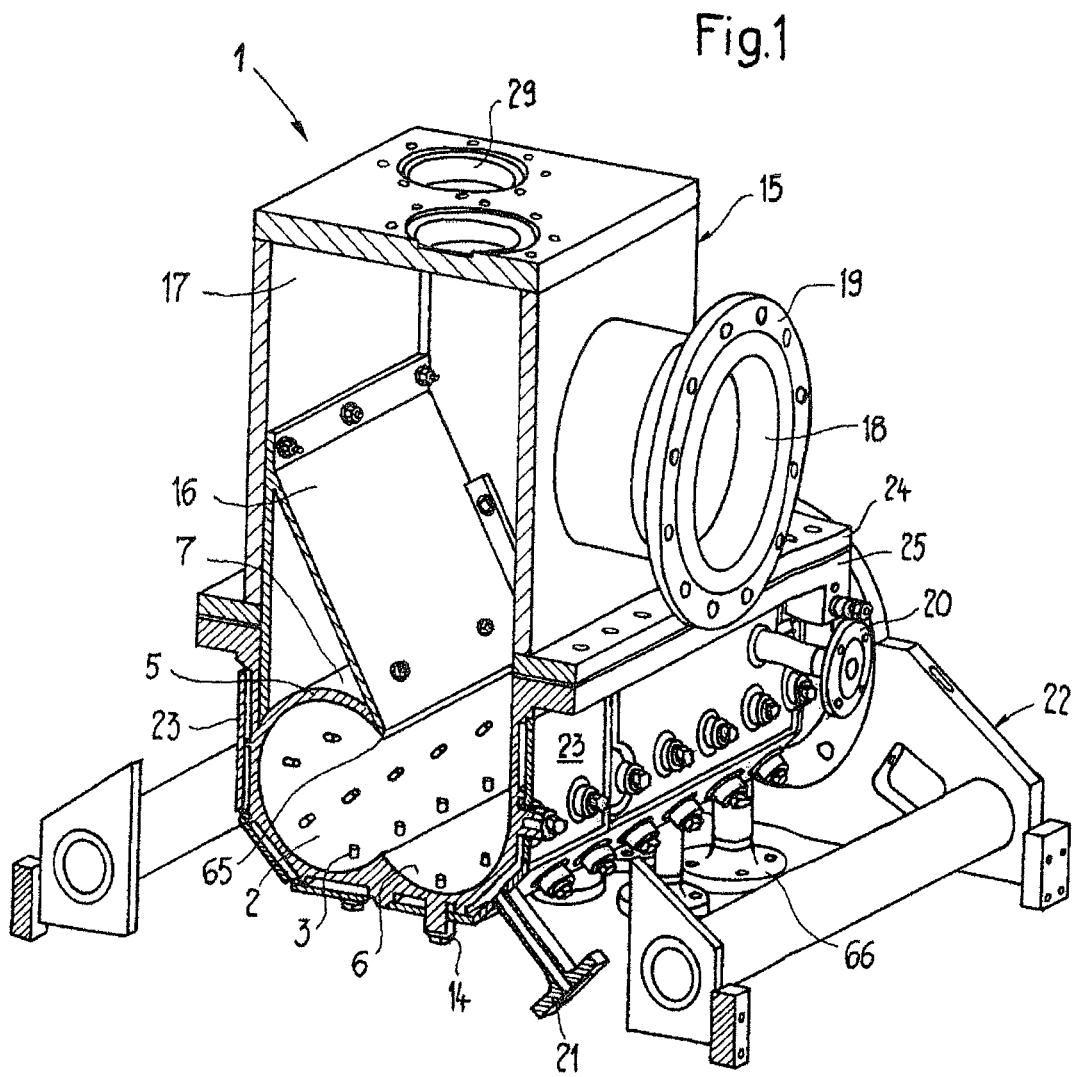
FIG. 1 a perspective view of an inventive reactor/mixer without shafts.

In FIG. 1 the inventive reactor/mixer is illustrated in a perspective view. In the shown embodiment, the housing 5 of the reactor/mixer 1 comprises a heating jacket 23 which at least partially encloses the latter. The heating jacket 23 comprises a heating medium inlet 20 and a heating medium outlet 21. The static mixing elements 3 are here mounted by means of pressure fittings 14 at the outside of the heating jacket 23 and protrude through respective openings in the wall of the housing 5 into the reaction chamber 2. However, also embodiments of the inventive reactor/mixer 1 without heating jacket 23 are conceivable. The inventive reactor/mixer 1 is supported in a reactor frame 22 and is connected by means of a flange-like projection 25 with a vapor collection space housing 15 (i.e. in particular screwed together or welded), which in this regard comprises a corresponding flange-like protrusion 24. The vapor collection space housing 15 comprises at its upper side two openings 29, which may serve as inspection window or as connection for further components. Within the vapor collection space 17, a transversely arranged baffle 16 is mounted. This baffle 16 shall for example during a mixing, respectively melting operation direct the resulting vapor in the direction of the vapor outlet 18 and avoid that depositions are formed at the below housing outer wall 7. The baffle 16 is in particular screwed together with a side wall of the vapor collection space housing 15. In this embodiment, the reaction chamber 2 is open, wherein the baffle 16 abuts at the opening edge 65 of the reaction chamber 2. The reaction chamber 2 comprises in the present embodiment, seen in the cross section, the shape of a horizontal eight, wherein presently the upper right half of the horizontal eight is open. The reactor/mixer 1 is, if applicable, supported by means of supports 66 additionally with regard to the ground.

Figure 2:
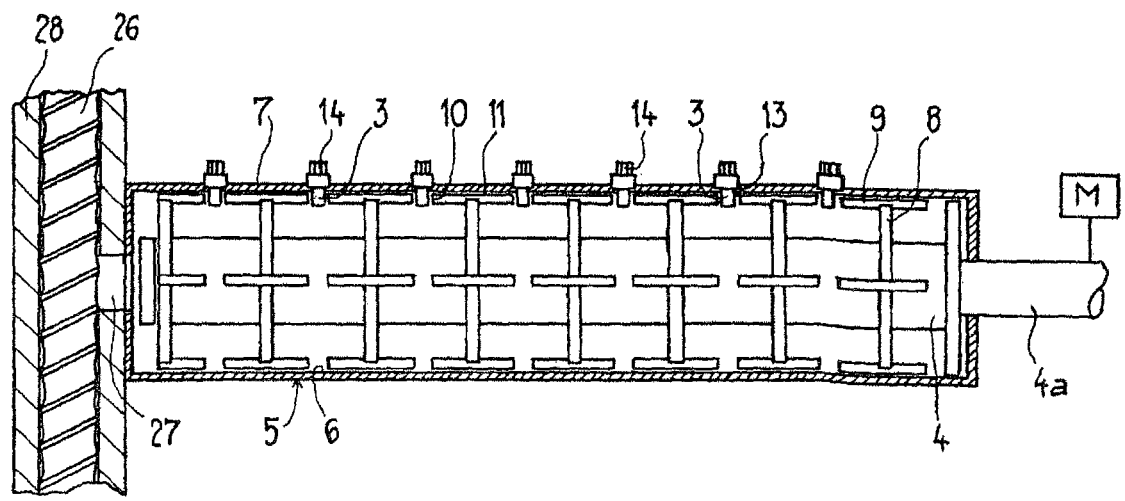
FIG. 2 a schematic side view of an inventive reactor/mixer with adjacent discharge screw (without further housing components)

FIG. 2 shows a schematic side view of an embodiment of an inventive reactor/mixer 1 without vapor collection space housing, reactor frame and heating jacket. As one can see, in this embodiment of the invention, the static mixing elements 3 are inserted through openings 13 in the housing wall 5 into the reaction chamber 2 and are mounted at the housing outer wall 7 by means of pressure armatures 14. The reaction chamber 2 is in fluid communication with the discharge screw 26 via the mixture inlet opening 27 of a discharge screw housing 28. The shaft 4 respectively the shaft end 4a is driven by the motor M (drive not shown). On the shaft 4 the disc-shaped elements 8 are arranged. Onto the disc-shaped elements 8 again the scrapers 9 are arranged, which presently comprise a T-shaped construction. The T-shaped scrapers 9 engage respectively between two of the rod-shaped static mixing elements 3, wherein respectively relatively small spaces are formed between the upper side of the T-shaped scrapers 9 and the housing inner wall 6 as well as between the side edges of the T-beam of the T-shaped scraper 9 and the static mixing elements 3. The arrangement is regularly chosen in such a way that the lower edge of the T-beam is approximately aligned with the front faces of the adjacent static mixing elements 3 which protrude into the reaction chamber 2. In this manner, in particular in the spaces 10, 11 sheer forces are created in an enhanced manner, which are helpful for the self-cleaning of the reactor/mixer 1 and by means of which in particular depositions respectively incrustations at the housing inner wall 6 may be avoided in an efficient manner.

Figure 3:
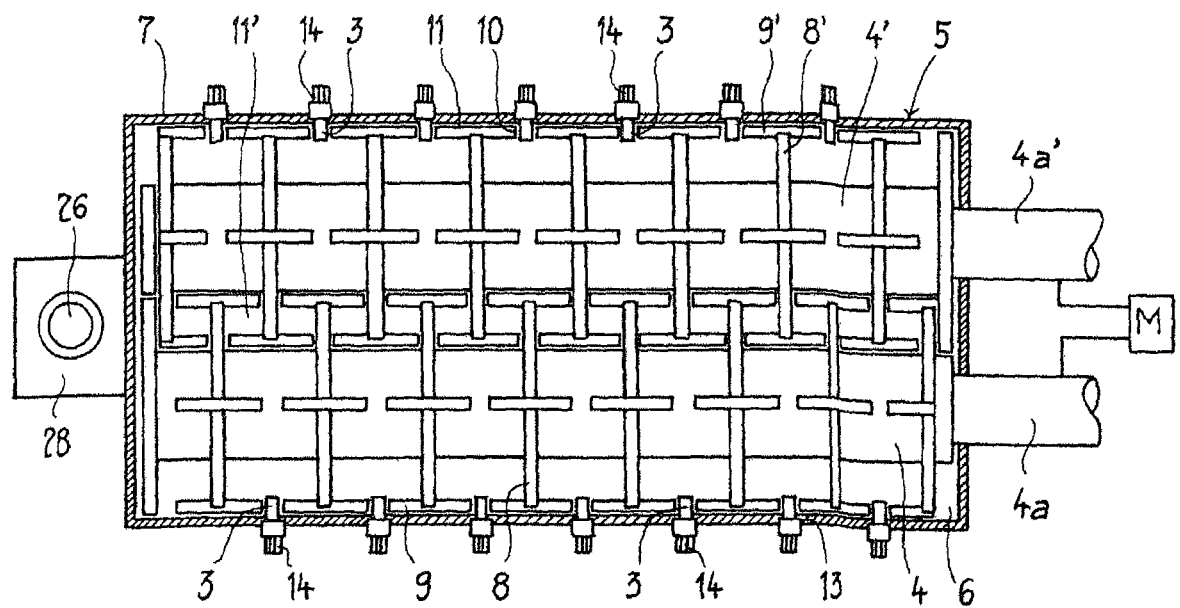
FIG. 3 a top view of an inventive reactor/mixer as well as onto a discharge screw according to FIG. 2.

FIG. 3 shows a schematic top view onto an inventive reactor/mixer 1 according to FIG. 2. The two shafts 4, 4' which are arranged parallel to one another, again comprise respectively disc shaped elements 8, 8' which are arranged axially offset to one another, and onto which again respectively scrapers 9, 9' are arranged which comprise a T-shaped construction. The shafts 4, 4', respectively the shaft ends 4a, 4a' are driven by means of motor M (drive not shown). However, also embodiments are conceivable, in which each shaft 4, 4' respectively each shaft end 4a, 4a' is driven by a separate motor. At the outlet sided end of the reactor/mixer 1, one may recognize the discharge screw housing 28 with the discharge screw 26. The discharge screw 26 may also be in the form of a discharge double screw. The static mixing elements 3 are again introduced through openings 13 in the housing 5 into the interior of the reaction chamber 2 and are again arranged relative to the scrapers 9, 9' as described with regard to FIG. 2. In the overlap area of the scrapers 9, 9' the latter engage due to their axially offset arrangement one behind the other, wherein the spaces 11' between the horizontal T-beams in the overlap area are regularly greater than the spaces 10, 11 between the T-shaped beams of the scrapers 9, 9' and the housing inner wall 6, respectively the static mixing elements 3. The static mixing elements 3 are again mounted by means of pressure fittings 14 at the housing outer wall 7. The disc-shaped elements 8, 8' may be arranged perpendicular relative to the shafts 4, 4'. They may however also be arranged at the circumference offset relative to the shafts 4, 4' wherein the tilting in the longitudinal direction of the shafts 4, 4' may increase or decrease. In a similar manner, the scrapers 9, 9' may, seen in the longitudinal direction, take an increasing slope relative to the shaft 4, 4', such that the latter comprise an inclined, respectively distorted course. Regularly, the T-beams of the scrapers 9, 9' are aligned with one another; they may however also be arranged offset to one another in the circumferential direction.

Figure 4:
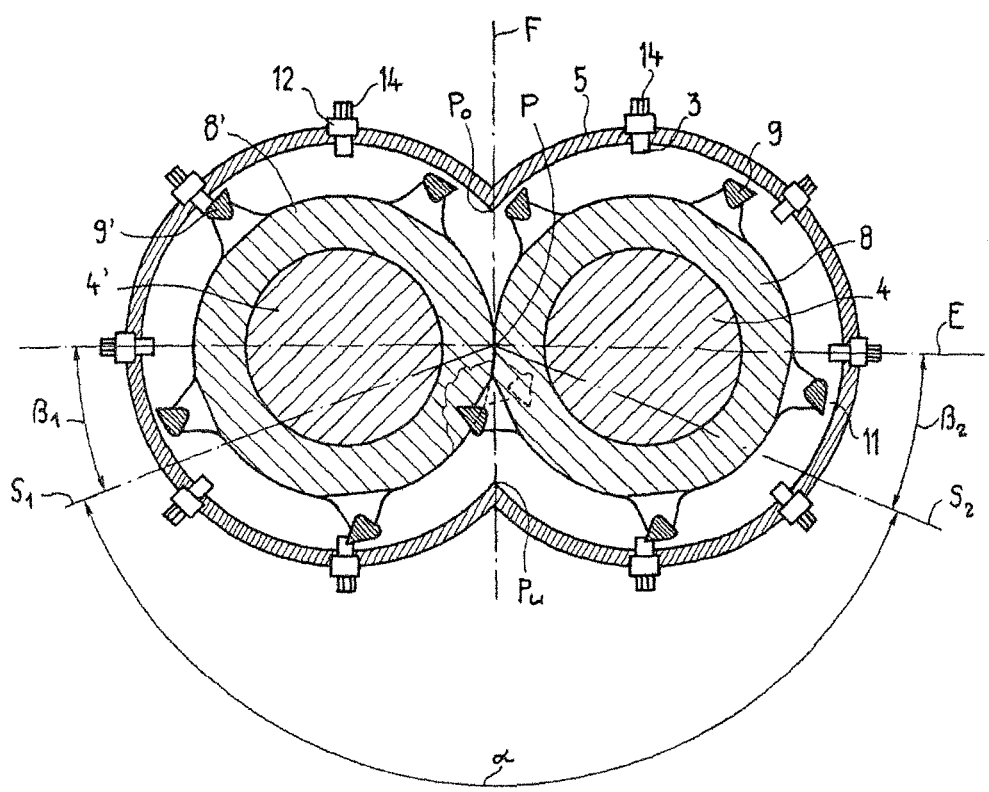
FIG. 4 a cross-sectional view through the reaction chamber and the shafts of an inventive reactor/mixer.

In FIG. 4 a schematic cross-sectional view through the reactor chamber 2 respectively a housing 5 of an inventive reactor/mixer 1 is illustrated. The housing 15 respectively the reaction chamber 2 essentially comprise the shape of a horizontal eight. Through the upper point PO of the constriction and the lower point PU of the constriction passes vertical axis F, which is intersected by the horizontal axis E in the center point P. The center point P therefore lies on the longitudinal axis of the housing 5. On the shafts 4, 4' which are arranged parallel to one another, the disc-shaped elements 8, 8' are arranged on which the scrapers 9, 9' are arranged. In the overlap area, i.e. approximately in the area between the points PO and PU, the scrapers 9 and 9' of the shafts 4 and 4' engage behind one another. At the circumference of the housing 5 the static mixing elements 3 are arranged. The latter may, as shown, comprise bores 12, through which admixtures respectively additives can be introduced into the reaction chamber 2. Through the bores 12, alternatively or additionally, also measuring devices may be introduced into the reaction chamber 2. The static mixing elements 3 are again mounted by means of pressure fittings 14 at the housing 5. Preferably, the static mixing elements 3 are arranged in the lower half of the housing 5, wherein an angular area α of 180°, preferably 150°, and further preferred of 120° is provided. The angular area α is thereby formed between the two legs S1 and S2, which intersect in the center point P. The angular areas β1 and β2 between the legs S1 and S2 and the horizontal axis E preferably comprise the same size (at an angular area α of 180° the legs S1 and S2 are identical with the horizontal plane E). In the aforementioned angular area α (i.e. within the usually filled space of the process zone) a particularly strong process intensification may be achieved by the arrangement of static mixing elements 3. The lower most static mixing elements 3 are thereby arranged preferably parallel relative to the vertical axis F. Further preferred the two laterally outermost static mixing elements 3 are aligned along the horizontal axis E, i.e. perpendicular to the vertical axis F. Between the respectively outermost and the lowermost static mixing element 3, preferably one or two further static mixing elements 3 are arranged. In practice, this was found particularly efficient for avoiding zones with insufficient mixing. For some applications, in particular with highly viscose media, it may however be useful, to distribute the static mixing elements 3 across the entire housing inner wall of the reactor/mixer 1, since here the shafts 4, 4' with the scrapers 9, 9' distribute the medium across the entire circumference of the reaction chamber 2.

Figure 5:
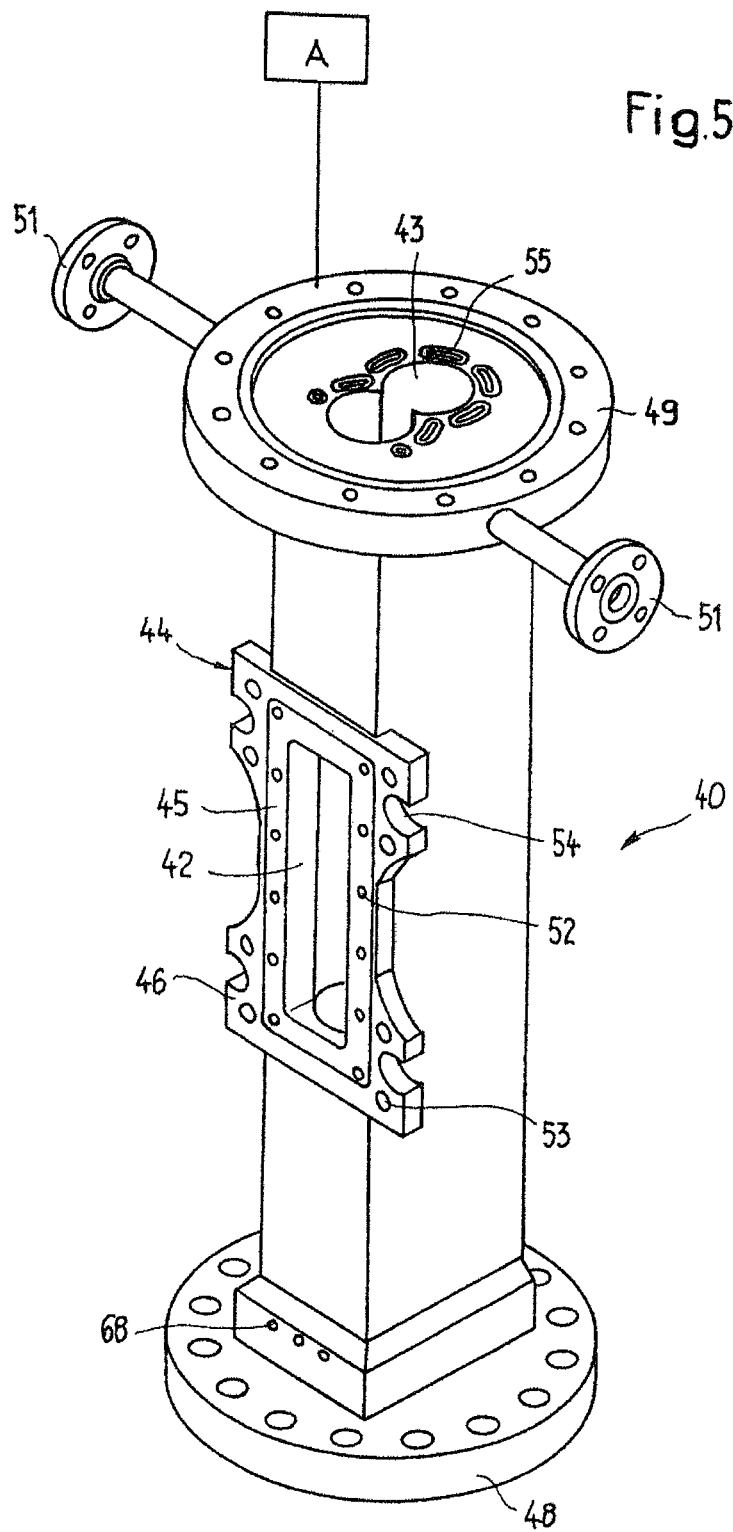
FIG. 5 a perspective view of an inventive discharge screw connector block.

In FIG. 5 an inventive discharge screw connector block 40 is illustrated. Through the discharge screw connector block 40 passes a channel in form of a deep hole bore, which presently is shaped for receiving a double discharge screw. At the upper end of the discharge screw connector block 40 a flange-like connector piece 49 is arranged. At the latter there is usually screwed on a drive for the discharge screw, respectively discharge double screw. Into the side wall of the flange-like connector piece 49 lead connections 51 for a cooling, respectively heat exchange liquid which flows in the tubes 55 which run through the discharge screw connector block 40. At the lower end of the discharge screw connector block 40, inlet and outlet openings 68 are provided, which are in fluid communication with the tubes 55. Below the inlet and outlet opening 68 there is arranged a lower flange-like connector piece 48. Approximately in the middle discharge screw connector block 40 there is arranged a fitting-like fixing piece 44, which serves for the connection with the end cap of a reactor/mixer. The fitting-like fixing piece 44 comprises an outer frame area 46, into which presently eight bores for screws are introduced, by means of which the discharge screw connector block 40 may be screwed onto the end cap of the reactor/mixer. Further, four laterally open bores are introduced into the outer frame area 46 of the fitting-like fixing piece 44. Through the latter, as explained below in detail, a screw nut as well as a sealing bolt may be brought into a corresponding blind hole bore of the end cap. The fitting-like fixing piece 44 further comprises an inner frame area 45, which encloses a mixture inlet opening 42 of the discharge screw connector block 40, respectively surrounds. Through the mixture inlet opening 42, the mixture enters into the channel 43 with the discharge double screw. During the transportation of the mixture through the discharge double screw, again heat is generated, which may be used by means of the heat exchange liquid flowing in the tubes 55.

Figure 6:
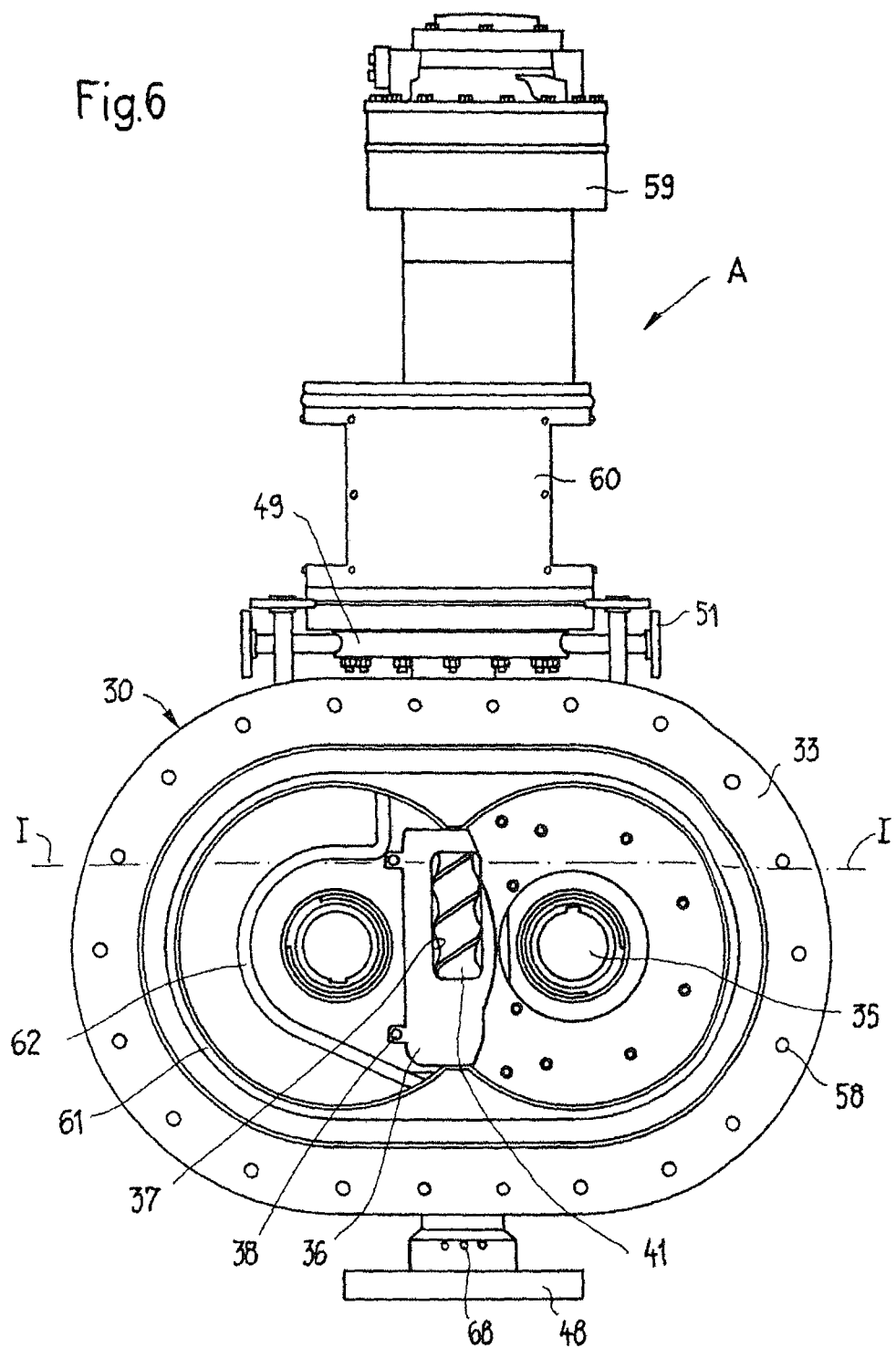
FIG. 6 an interior view of an inventive system including end cap and discharge screw connector block.

FIG. 6 illustrates an interior view of an inventive system including an end cap and a discharge screw connector block—i.e. seen from the reaction chamber of the reactor/mixer. The drive A with the motor 59 and the gear 60 is arranged on the flange-like connector piece 49, respectively screwed on. The end cap 30 comprises circumferential bores 58, which serve for receiving screws, by means of which the end cap 30 may be mounted at the reactor/mixer. The discharge double screw 41 runs perpendicularly behind the cross sectional plane between the two bearings 35 for the shaft ends. Between the two bearings 35, there is arranged a screen 36 with an opening 37, through which the mixture may enter through the end cap into the mixture inlet opening of the discharge screw connector block. The opening 37 of the screen 36 is smaller than the mixture inlet opening 42 of the discharge screw connector block 40. By means of this cross sectional expansion, a particularly suitable inflow of the discharge double screw 41 may be achieved. In the area of the respective connection area of the end cap inner side 33 which corresponds to a horizontal eight, there are provided sealing means 61, 62. The screen 36 is screwed together with the discharge screw connector block 40 by means of screw bolts 38, which is explained in more detail further below. At the lower end of the discharge screw connector block one recognizes again the flange-like connector piece 48 as well as the inlet and outlet openings 68.

Figure 7:
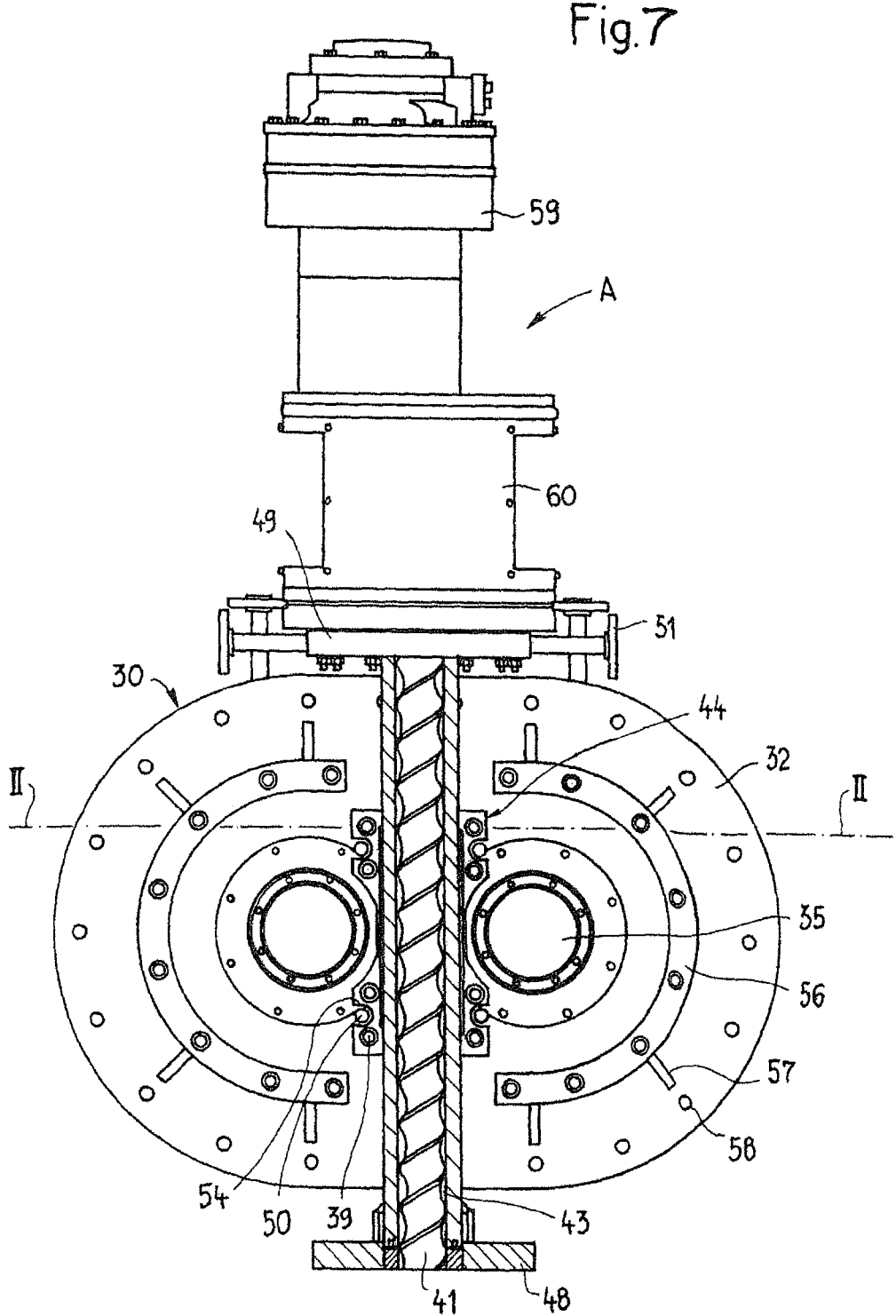
FIG. 7 an exterior view of an inventive system including end cap and discharge screw connector block.

An exterior view of the inventive system including end cap 30 and discharge screw connector block 40 is illustrated in FIG. 7. On the outside 32 of the end cap 30, two horse-shoe shaped protrusions 56 for mounting the bearing housing of the shafts 4, 4' are arranged, which are connected via struts 57 with the end cap 30. The discharge screw connector block 40 with the discharge double screw 41, respectively the channel 43 extends perpendicularly between the two bearings 35 for the shaft ends. The discharge screw connector block 40 is screwed together with the end cap 30 by means of the fitting-like fixing piece 44 and the screws 39. In the laterally open bores 54, respectively sealing bolts 50 are arranged.

Figure 8:
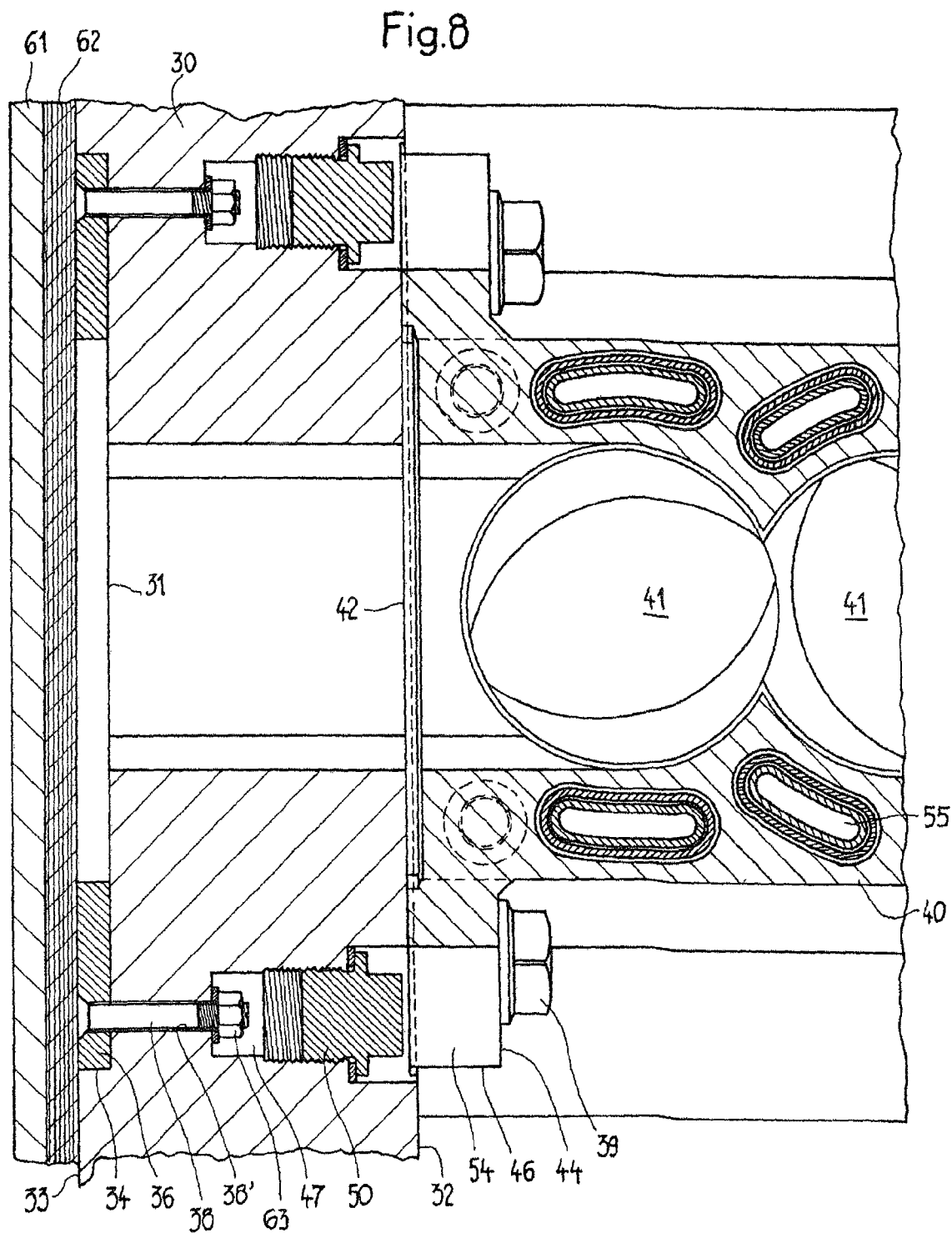
FIG. 8 a partial top view of a cross-section along the line I-I in FIG. 6.

FIG. 8 shows a partial top view onto a cross-section through the inventive system along the line I-I in FIG. 6. The end cap 30 is arranged between the discharge screw connector block 40 and the screen 36 which is inserted into the recess 34 of the end cap inside 33. The screen 36 is screwed together with corresponding screw nuts via screw bolts 38 (and bores 38'), which are introduced in blind hole bores 47 in the end cap outside 32, which are again closed by means of sealing bolts 50. The screw nut 63 and the sealing bolts 50 are introduced, respectively mounted through the laterally open bores 54 of the outer frame area 46 of the fitting-like fixing piece 44. One can further see the screws 39 by means of which the discharge screw connector block 40 is screwed onto the end cap as well as the discharge double screw 41 and the sealing means 61, 62. Laterally adjacent to the discharge double screw 41 are arranged tubes 55.

Figure 9:
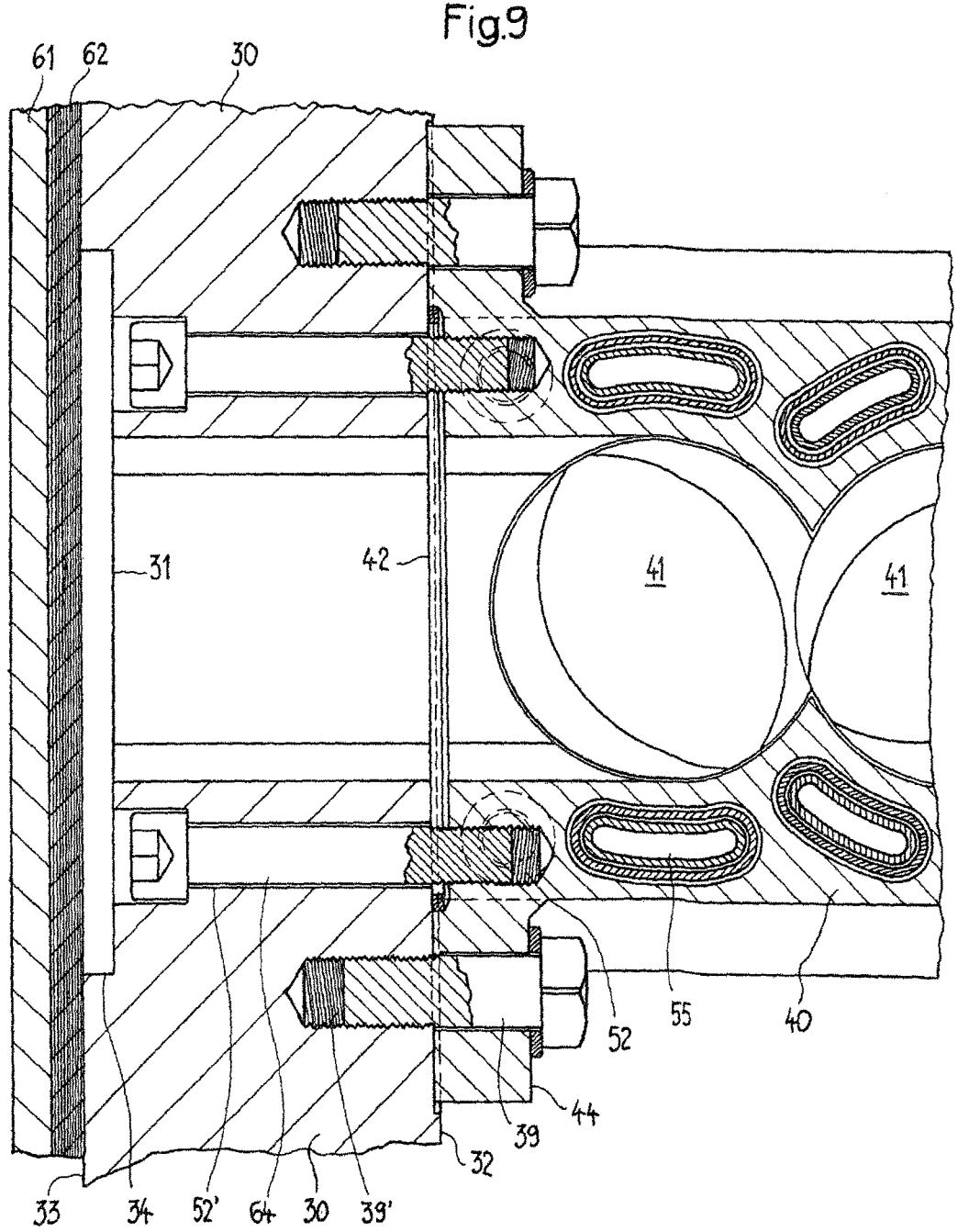
FIG. 9 a partial top view on a cross-section along the line II-II in FIG. 7.

In FIG. 9 a partial top view on a cross section along the line II-II in FIG. 7 is illustrated. Here, one recognizes in particular the recess 34 in the inside 33 of the end cap 30 (without introduced screen 36). One can see the hexagon socket screws 64, which have been introduced into the bores 52' which are arranged around the mixture outlet opening 31 of the end cap 30 and which correspond to the bores 52 in the inner frame area 45 of the fitting-like fixing piece 44. The hexagon socket screws 64 are later on covered by the screen 36 which is tightly pulled into the recess 34 (cf. above). Therefore, a screw joint is established with the inner frame area 45 of the discharge screw connector block 40. Seen from the other side, the discharge screw connector block 40 is screwed together with the end cap 30 by means of screws 39, the end cap 30 comprising respective bores 39' at its outside 32.

The inventive system, respectively the discharge screw connector block is preferably used together with an inventive reactor/mixer.

The invention claimed is:

1. Reactor/Mixer, in particular for process engineering treatment of highly viscose, elastic and/or solid containing reaction substance and mixture, comprising:
    a housing with an inner as well as an outer wall which defines a reaction chamber and which encloses at least two shafts fully or partially, wherein
    the shafts are supported rotatably in the housing and/or in lateral attachment parts of the housing and are driven by a motor wherein
    on the shafts, disc shaped elements are arranged which are axially offset to one another, wherein the disc shaped elements respectively comprise on their circumference outwardly directed T-shaped scrapers having T-beams,
    wherein the disc shaped elements and/or the T-shaped scrapers of a shaft respectively carry out with the disc shaped elements and/or the T-shaped scrapers of an adjacent shaft as well as with the housing a mutual kinematic cleaning of the disc shaped elements and/or T-shaped scrapers,
    wherein at the housing inner wall inwardly directed static mixing elements are arranged, which interact with the T-shaped scrapers of the at least two shafts in such a way that in the area of spaces in between the T-shaped scrapers the static mixing elements and the housing inner wall sheer forces are generated in an enhanced manner, wherein the lower edge of the T-beam of the T-shaped scrapers is approximately aligned with the front faces of the adjacent static mixing elements being directed towards the shafts, respectively, and wherein the static mixing elements are arranged in an angular area $\alpha$ of about 180° in the lower area of the housing inner wall departing from the centerpoint, and wherein the static mixing elements are arranged in even circumferential distances of 30° at the housing inner wall.

2. Reactor/Mixer according to claim 1, wherein the at least two shafts are respectively driven with the same rotational speed by the motor.

3. Reactor/Mixer according to claim 1, wherein the reaction chamber comprises in the cross section approximately the shape of a horizontal eight with a centerpoint through which a horizontal axis and a vertical axis pass.

4. Reactor/Mixer according to claim 1, wherein the static mixing elements are arranged in equal circumferential distances at the housing inner wall.

5. Reactor/Mixer according to claim 1, wherein the static mixing elements are arranged in the longitudinal direction respectively in a row in an aligned manner.

6. Reactor/Mixer according to claim 1, wherein the static mixing elements are arranged across the entire length of the reactor/mixer.

7. Reactor/Mixer according to claim 1, wherein the static mixing elements comprise one or multiple bores.

8. Reactor/Mixer according to claim 7, wherein the one or multiple bores are equipped with measuring devices.

9. Reactor/Mixer according to claim 1, wherein the static mixing elements are inserted through an opening in the housing wall into the reactor/mixer and are mounted at the housing by means of a pressure fitting.

10. Reactor/Mixer according to claim 1, wherein the reactor/mixer comprises an at least partly open housing.

11. Reactor/Mixer according to claim 10, wherein the reactor/mixer comprises a large volume vapor collection space above the at least partially open housing.

12. Reactor/Mixer according to claim 11, wherein in the large volume vapor collection space a baffle is arranged.

13. Reactor/Mixer according to claim 1, wherein the lower area is a lower half of the Reactor/Mixer and the static mixing elements are evenly arranged in a left part and a right part of the lower half of the Reactor/Mixer corresponding to the at least two shafts.

14. Reactor/Mixer according to claim 13, wherein a lower most one of the static mixing elements in each of the left part and right part are aligned respectively parallel to a vertical axis and a laterally outermost one of the static mixing elements in each of the left part and the right part are aligned along a horizontal axis.

15. Reactor/Mixer according to claim 1, wherein the static mixing elements are rod-shaped.

* * * * *